(12) United States Patent
Morikawa

(10) Patent No.: US 8,966,354 B2
(45) Date of Patent: Feb. 24, 2015

(54) COMMUNICATION SYSTEM VIA CASCADE CONNECTION AND COMMUNICATION DEVICE

(71) Applicant: Canon Kabushiki Kaisha, Tokyo (JP)

(72) Inventor: Daisuke Morikawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 13/897,019

(22) Filed: May 17, 2013

(65) Prior Publication Data
US 2014/0006912 A1    Jan. 2, 2014

(30) Foreign Application Priority Data

Jun. 27, 2012    (JP) ................. 2012-143966

(51) Int. Cl.
| | |
|---|---|
| G06F 11/10 | (2006.01) |
| H03M 13/09 | (2006.01) |
| H03M 9/00 | (2006.01) |
| H04L 29/06 | (2006.01) |
| H04L 12/46 | (2006.01) |
| H04L 1/00 | (2006.01) |
| H04L 12/40 | (2006.01) |

(52) U.S. Cl.
CPC ............. H03M 13/09 (2013.01); H03M 9/00 (2013.01); H04L 12/4637 (2013.01); H04L 29/06 (2013.01); G05B 2219/21028 (2013.01); H04L 1/0061 (2013.01); H04L 12/40 (2013.01); G06F 11/1004 (2013.01); G05B 2219/21039 (2013.01)
USPC .......... 714/807; 714/774; 714/798; 714/799; 714/808; 709/219; 709/223; 709/231; 709/232; 709/234

(58) Field of Classification Search
CPC ..... H04L 29/06; H04L 12/4637; H04L 12/40; H04L 1/0061; H03M 13/09; H03M 9/00; G05B 2219/21039; G05B 2219/21028; G06F 11/1004
USPC ......... 709/219, 223, 231, 232, 234, 251, 253; 714/447, 798, 799, 807, 808
See application file for complete search history.

(56) References Cited

U.S. PATENT DOCUMENTS

| | | | | |
|---|---|---|---|---|
| 6,134,604 | A * | 10/2000 | Soya et al. ................. | 710/1 |
| 6,834,321 | B2 * | 12/2004 | Yokoyama ................ | 710/316 |
| 2003/0110344 | A1 * | 6/2003 | Szczepanek et al. ....... | 711/100 |
| 2003/0156552 | A1 * | 8/2003 | Banker et al. ............. | 370/266 |
| 2010/0005375 | A1 * | 1/2010 | Dell et al. ................ | 714/807 |

FOREIGN PATENT DOCUMENTS

JP    11-321027    11/1999

* cited by examiner

*Primary Examiner* — John Trimmings
(74) *Attorney, Agent, or Firm* — Fitzpatrick, Cella, Harper & Scinto

(57) ABSTRACT

A communication system having a main control portion (MCP) to transmit information destined to a device n cascade levels down, and create an error detection code (CRC code) for data that contains a count of remaining cascade levels until an n-th cascade level and the information. The code is transmitted to an upstream sub-control portion (USCP) with the data. The USCP creates a CRC code for the data, and compares the created and received codes. For a match, the USCP determines whether the information is destined to itself based on the remaining cascade level count. When the information is not so destined, the USCP creates new data with the remaining cascade level count reduced by 1, and a CRC code for the new data, and transmits the created code to a further device, with the new data.

13 Claims, 11 Drawing Sheets

COMMUNICATION SYSTEM VIA CASCADE CONNECTION AND COMMUNICATION DEVICE

BACKGROUND OF THE INVENTION

1. Field of the Invention

The present invention relates to a communication system that connects a plurality of communication devices by cascade connection.

2. Description of the Related Art

Many image forming apparatus that use electrophotography, for instance, employ a centralized control method by a main control portion. In this type of image forming apparatus, however, the concentration of control puts heavy load on a central processing unit (CPU) in the main control portion. The main control portion therefore needs as high performance a CPU as possible in order to prevent a drop in performance.

Some recent image forming apparatus deal with the heavy load by distributed control of image forming processing in which the control system is distributed so that the main control portion at the center of control cooperates with a plurality of sub-control portions provided in a load unit. In this case, a bundle of control communication wires needs to be led out to the plurality of sub-control portions at a great physical distance from the main control portion, which is increasing the cost of bundle of wires.

Therefore, a different type of distributed control is also practiced which divides a plurality of control portions constituting an image forming apparatus among sub-CPUs or application-specific integrated circuits (ASICs). In this type of distributed control, serial communication is often employed for data exchange between CPUs, between a CPU and an ASIC, or between ASICs. The data exchange uses communication packets in many cases.

With communication lines used for serial communication, too, if main CPUs and sub-CPUs (including ASICs. Hereinafter, the term "sub-CPU" includes "ASIC") are associated simply on a one-to-one basis, as many more communication lines as the number of sub-CPUs are needed. As a solution, communication systems via cascade connection have been proposed which minimize the number of communication lines used by connecting a plurality of sub-CPUs by cascade connection and using an upstream sub-CPU to relay communication to a downstream sub-CPU.

For example, Japanese Patent Application Laid-open No. Hei 11-321027 discloses a communication system in which the relative address of a cascade connection destination device viewed from a device with a communication control device mounted thereto is determined and used for communication to and from the cascade connection destination device. In this communication system, a main CPU on the master side holds communication to and from a sub-CPU on the slave side. The main CPU also holds communication to and from a sub-CPU that is connected downstream the slave-side sub-CPU (a cascade connection destination sub-CPU viewed from the main CPU). This communication mode has an advantage in that the number and length of communication lines are minimized by sharing communication lines.

In a communication system disclosed in U.S. Pat. No. 6,834,321, a main CPU determines how many cascade levels are there till a sub-CPU at the tail end of sub-CPUs connected by cascade connection. Specifically, each sub-CPU adds "1" to an ID number within a communication packet (a number for identifying communication to that sub-CPU) and sequentially transfers the resultant ID number to its cascade connection destination. In the case where a sub-CPU at the end of the line has not received a response from a cascade connection destination for a given period of time or longer, this sub-CPU is determined as the tail end CPU. The sub-CPU then puts an ID indicating that this sub-CPU is at the tail end in the communication packet, and transmits data to the main CPU via the group of upstream sub-CPUs. The main CPU can thus grasp how many cascade levels are there to reach the tail end. From then on, the main CPU can know the cascade level of a sub-CPU with which the main CPU is to communicate.

However, conventional communication systems premised on cascade connection allow the intrusion of noise in a communication line or the like to distort data contained in a communication packet in some cases. The data distortion causes problems such as a failure to execute processing accurately.

For example, if noise is superimposed at a point where the relative address is specified in Japanese Patent Application Laid-open No. Hei 11-321027 and at a point where an ID is specified in U.S. Pat. No. 6,834,321, the superimposing of noise can cause misinterpretation of the relative address or the ID. As a result, a main CPU which is supposed to hold communication to a sub-CPU connected directly to the main CPU may erroneously have communication to another sub-CPU which is connected by cascade connection. In addition, the lack of the originally necessary communication can cause the overall system operation to abort.

A measure for ensuring communication quality against such noise is detecting an error in data contained in a communication packet. Attaching a cyclic redundancy check (CRC) code or a checksum at the last frame location of a communication packet can be given as an example. However, the following problems unique to communication via cascade connection remain even after attaching a CRC code or a checksum.

In the case where a sub-CPU that has received a communication packet transfers the communication packet to its cascade connection destination after buffering the entire communication packet in order to check data for an error, the transfer is delayed by an amount of time required for the buffering. If this processing is to be performed in each of sub-CPUs connected by cascade connection, the effective communication baud rate drops in proportion to the number of cascade connection levels.

A method of minimizing the drop in communication baud rate has also been proposed in which the transfer of a communication packet to a downstream sub-CPU is started during the reception of the communication packet from the main CPU by an upstream sub-CPU. In this case, however, the communication packet is transferred before the upstream sub-CPU checks the CRC code and, if necessary, recalculates the CRC code. The downstream sub-CPU therefore cannot conduct data error detection with an effective CRC code.

SUMMARY OF THE INVENTION

In order to solve the above-mentioned problems, a communication system according to an exemplary embodiment of the present invention includes a plurality of communication devices including a first communication device and a second communication device, which are connected by cascade connection. The first communication device includes first transmitting unit configured to transmit first information to the second communication device which is on a cascade level next to the first communication device. The first information comprising communication data destined to another communication device, which is one of the plurality of communication devices, that is n-th cascade level down from the first communication device, a count of remaining cascade level till the n-th cascade level, and an first error detection code.

The first communication device further includes first creating unit configured to create the first error detection code for the communication data and the count.

The first communication device further includes the second communication device including: second creating unit configured to create second error detection code for the communication data and the count in the received first information; a determining unit configured to determine, in the case where the second error detection code match with the first error detection code in the received first information, whether or not the communication data is destined to the second communication device based on the count in the first information; second creating unit configured to, in the case where the communication data is not destined to the second communication device, correct the count, and create a second error detection code for the communication data and the corrected count.

The first communication device further includes second transmitting unit configured to, in the case where the communication data is not destined to the second communication device, transmit second information comprising the communication data, the corrected count and the second error detection code to a third communication device, which is on a cascade level next to the second communication device.

a plurality of communication devices including a first communication device and a second communication device, which are connected by cascade connection. The first communication device is configured to: transmit information destined to another communication device which is one of the plurality of communication devices that is n cascade levels down from the first communication device; create an error detection code for communication data that includes a count of remaining cascade levels till the n-th cascade level and the information; and transmit the error detection code along with the communication data to the second communication device, which is on a cascade level next to the first communication device. The second communication device is configured to: create an error detection code for the communication data received from the first communication device; compare the created error detection code against the received error detection code; when the error detection codes match, determine whether or not the information is destined to the second communication device based on the remaining cascade level count included in the communication data; when the information is not destined to the second communication device, create new communication data in which the remaining cascade level count is reduced by 1 and newly create an error detection code for the new communication data; and transmit the created error detection code along with the new communication data to a third communication device, which is on a cascade level next to the second communication device.

Further features of the present invention will become apparent from the following description of exemplary embodiments (with reference to the attached drawings).

DESCRIPTION OF THE EMBODIMENTS

An embodiment of the present invention is described below.

(Communication System Configuration)

Figure 1:
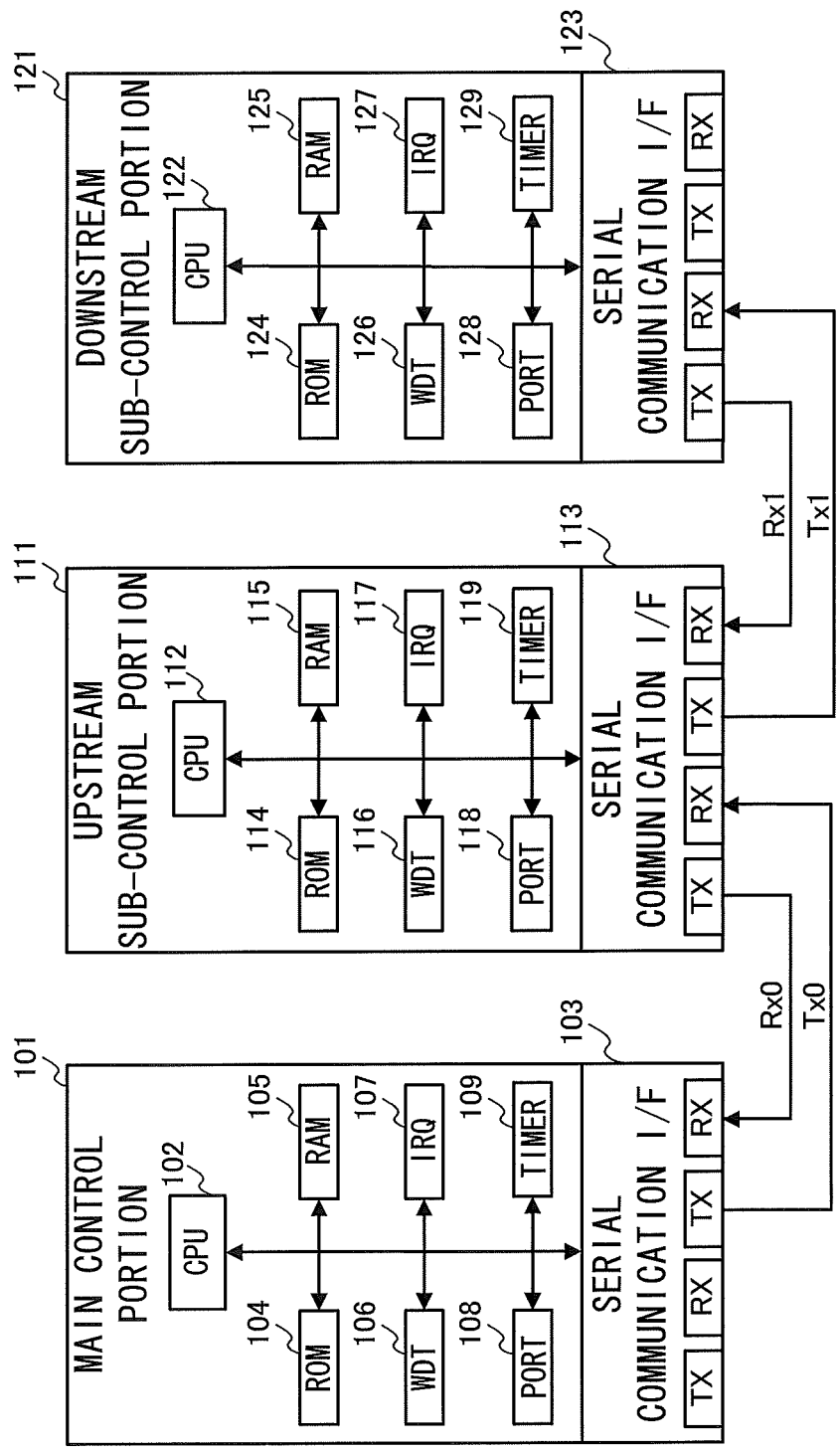
FIG. 1 is a configuration diagram illustrating a communication system according to an exemplary embodiment of the present invention.

FIG. 1 is a diagram illustrating a configuration example of a communication system according to this embodiment.

The communication system of this embodiment is built by connecting a main control portion 101, an upstream sub-control portion 111, and a downstream sub-control portion 121 by cascade connection in a manner that allows serial communication between every two adjacent control portions. The main control portion 101 is mounted in a main control unit that handles overall operation control in, for example, an image forming apparatus. The sub-control portions 111 and 121 are mounted in image forming units of the image forming apparatus or sub-control units which are mounted in a conveyor mechanism or the like of the image forming apparatus.

The control portions 101, 111, and 121 have the same function with regard to communication, and exchange data between each other on a packet-by-packet basis with the use of two-wire asynchronous (Universal Asynchronous Receiver/Transmitter: UART) serial communication. Employing this cascade connection allows the downstream sub-control portion 121 to share a communication line between the main control portion 101 and the upstream sub-control portion 111, which helps to reduce the cost of wire materials and the cost of communication line connectors.

While the cascade connection in the example of FIG. 1 has two cascade levels, the upstream sub-control portion 111 and the downstream sub-control portion 121, the communication system may have more than two sub-control portions connected by cascade connection.

The main control portion 101 monitors the operation state of the sub-control portions 111 and 121, and also takes the lead in an operation of giving instructions to the sub-control portions 111 and 121. The main control portion 101 can give an instruction to the upstream sub-control portion 111 or the downstream sub-control portion 121 over serial communication. An instruction from the main control portion 101 to the downstream sub-control portion 121 is given via the upstream sub-control portion 111.

The main control portion 101 has a CPU 102 which executes a given computer program to control various devices and to execute processing including generating communication data which is described later and generating an error detection code, with the use of peripheral devices. The main control portion 101 also includes a read only memory (ROM) 104 and a random access memory (RAM) 105. The ROM 104 keeps data and a computer program that the CPU 102 can read. The RAM 105 is used as a work memory of the CPU 102.

The main control portion 101 also has a serial communication interface (I/F) 103 for controlling serial communication between the main control portion 101 and the upstream sub-control portion 111.

The main control portion 101 further includes a watch dog timer (WDT) 106, an interrupt request (IRQ) 107, a port 108, and a timer 109. The WDT 106 monitors the operation state of the CPU 102. The IRQ 107 prompts the CPU 102 to suspend processing if necessary, and receives a cause of interrupt for switching processing. The port 108 has a plurality of general-purpose input/output ports. The timer 109 causes fast-cycle interrupts for generating a motor driving signal or the like.

The upstream sub-control portion 111 and the downstream sub-control portion 121 are the same as the main control portion 101 with regard to communication function. Descriptions on points common to the main control portion 101 and the sub-control portions are therefore omitted. However, the present invention is not limited to cases where the CPU of each sub-control portion is the same as the CPU 102, and the sub-control portions 111 and 121 only need to implement a function equivalent to that of the serial communication I/F 103, in particular.

The serial communication I/F 103 is described next with reference to FIG. 2.

The serial communication I/F 103 functions as communication control means when serial communication is held between the main control portion 101 and another control portion which is connected by cascade connection.

The serial communication I/F 103 includes a data counting portion 201, a clock generating portion 202, and a buffer portion 204 which contains a transmission buffer and a reception buffer. The serial communication I/F 103 also includes parallel-serial (PS) conversion portions 205 and 207, serial-parallel (SP) conversion portions 206 and 208, and a buffer controller 209. The serial communication I/F 103 exchanges data, commands, and other types of information with the CPU 102 and other components via a CPU bus 203.

The PS conversion portions 205 and 207 convert input parallel data into serial data, which is kept in the transmission buffer of the buffer portion 204 via the buffer controller 209. The SP conversion portions 206 and 208 convert input serial data into parallel data, which is kept in the reception buffer of the buffer portion 204 via the buffer controller 209. Both the PS conversion portions and the SP conversion portions can transmit/receive data and set the data transfer rate individually.

The data counting portion 201 counts how many pieces of data queued for transmission are kept in the buffer portion 204. The clock generating portion 202 receives the count of pieces of data queued for transmission in the buffer portion 204 from the data counting portion 201, and generates clocks.

The buffer controller 209 performs control for transferring various types of information kept in the transmission buffer of the buffer portion 204 to the PS conversion portions 205 and 207, or control for transferring information converted in the SP conversion portions 206 and 208 to the reception buffer of the buffer portion 204.

The operation of the serial communication I/F 103 in serial communication between the main control portion 101 and the upstream sub-control portion 111 is described with reference to FIG. 2.

The operation in communication between the upstream sub-control portion 111 and the downstream sub-control portion 121 is the same as the operation in communication between the main control portion 101 and the upstream sub-control portion 111.

The CPU 102 of the main control portion 101 writes transmission information via the CPU bus 203 in the transmission buffer within the buffer portion 204 of the serial communication I/F 103. This information corresponds to the data queued for transmission which is described above. The data queued for transmission is read by the PS conversion portion 205 and, after undergoing PS conversion, is transmitted to a serial communication I/F 113 of the upstream sub-control portion 111.

Reception data from the serial communication I/F 113 of the upstream sub-control portion 111 undergoes SP conversion by the SP conversion portion 206 and then is stored in the reception buffer of the buffer portion 204. The stored reception data is read by the CPU 102 via the CPU bus 203.

The data counting portion 201 increases the current count by 1 each time data queued for transmission is written in the buffer portion 204 from the CPU bus 203. The data counting portion 201 reduces the current count by 1 each time data queued for transmission is read to the PS conversion portion 205. Pieces of data queued for transmission are counted in this manner.

Similarly, the data counting portion 201 increases the current count by 1 each time serial data obtained by conversion in the SP conversion portion 206 is kept in the reception buffer of the buffer portion 204. The data counting portion 201 reduces the current count by 1 each time data is read out of the reception buffer of the buffer portion 204 via the CPU bus 203.

The clock generating portion 202 receives the count of pieces of data queued for transmission in the buffer portion 204 from the data counting portion 201, and generates clocks in a manner determined by the data count received. Specifically, the maximum value of a frequency divider counter is switched in a manner that suits the data count. The frequency divider counter is used for determining a count required to transmit 1 bit width of data in serial communication. Specifically, when the count of data queued for transmission is high, the value of the frequency divider counter is reduced to raise the communication baud rate and thereby shorten the time required for the transmission of one bit. As a result, data queued for transmission in the transmission buffer is reduced quickly.

When to output data queued for transmission is described next. This embodiment employs a counter that counts with the use of system clocks input to the serial communication I/F 103, and the counter counts how many clocks have been input till a count value at which one bit of data queued for transmission can be generated is reached. The counter is then cleared to "0" and again counts up to the given count value. Clearing the counter and counting up to the given count value are repeated so that when to output data to the PS conversion portion 205 is timed with the repetition.

The mode of serial communication between the main control portion 101 and the downstream sub-control portion 121, which is connected by cascade connection, is described next.

Communication between the main control portion 101 and the downstream sub-control portion 121 is relayed by the serial communication I/F 113 of the upstream sub-control portion 111. The description given here is therefore focused on the operation of the upstream sub-control portion 111, in particular, the operation of the serial communication I/F 113 provided in the upstream sub-control portion 111.

Figure 2:
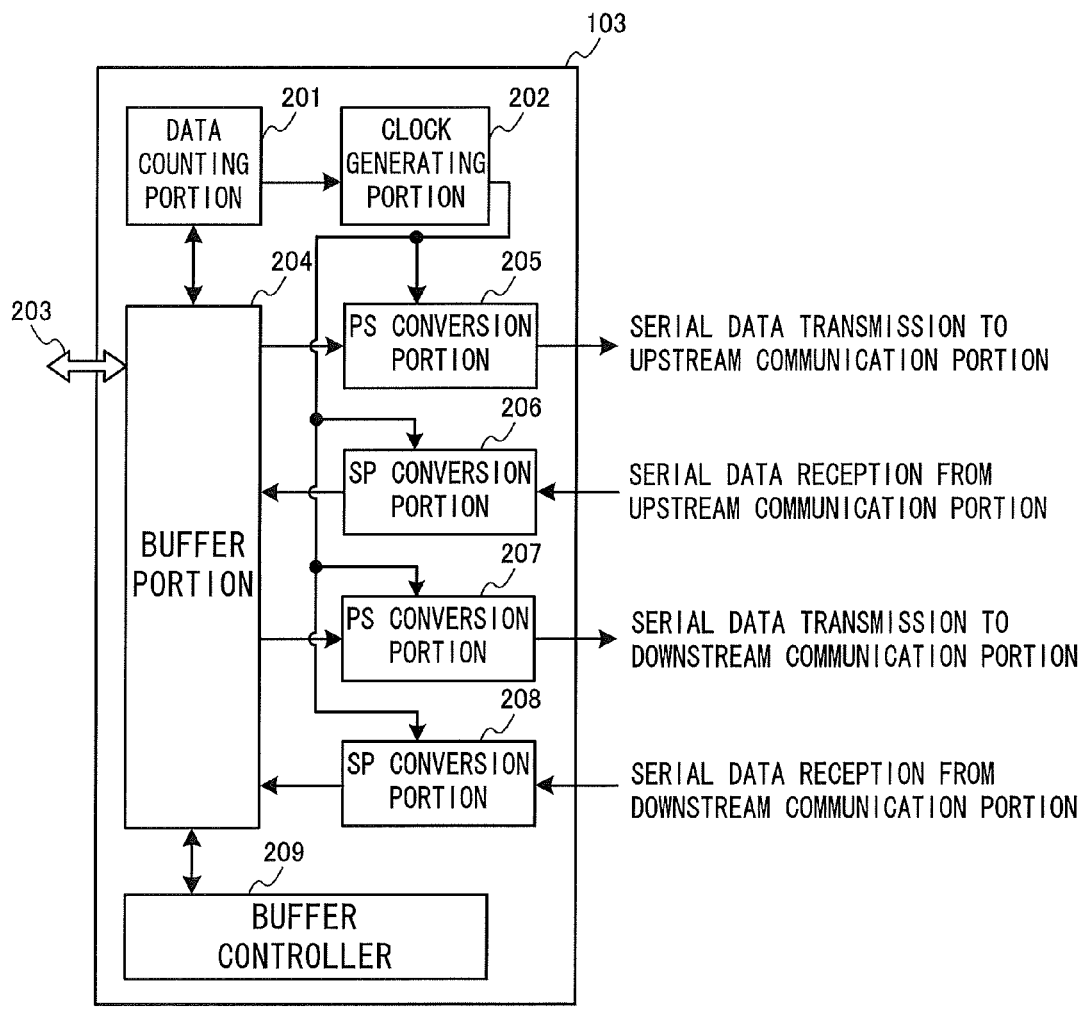
FIG. 2 is an internal configuration diagram of a serial communication I/F.

The configuration of the serial communication I/F 113 of the upstream sub-control portion 111 is the same as that of the serial communication I/F 103 of the main control portion 101 which is illustrated in FIG. 2. Components of the serial communication I/F 113 that are the same as those of the serial communication I/F 103 are denoted by the symbols used in FIG. 2 in order to omit descriptions thereof.

The upstream sub-control portion 111 receives packeted communication data (hereinafter referred to as "communication packet") from the main control portion 101 (the serial communication I/F 103), and converts the received communication packet in the SP conversion portion 206 into parallel data, which is kept in the reception buffer of the buffer portion 204. Thereafter, data rewrite described later or the like is conducted by a CPU 112, and the rewritten communication packet is converted into serial data in the PS conversion portion 207. The serial data obtained by conversion is transmitted to the downstream sub-control portion 121 (a serial communication I/F 123).

The serial communication I/F 113 also receives, by serial communication, a communication packet destined to the main control portion 101 from the downstream sub-control portion 121 (the serial communication I/F 123). The received serial data is converted in the SP conversion portion 208 into parallel data, which is kept in the reception buffer of the buffer portion 204. Thereafter, the kept information is converted in the PS conversion portion 205 into serial data, which is transmitted to the main control portion 101.

Figure 3:
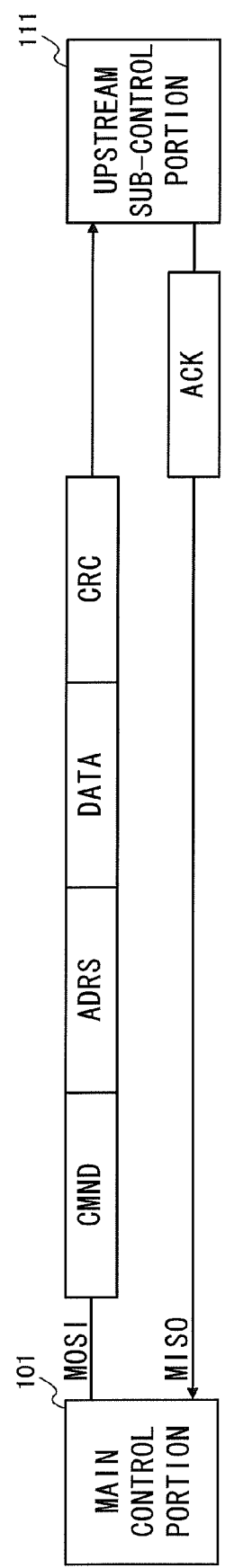
FIG. 3 is a diagram illustrating a configuration example of communication packets that are exchanged to write data in a transmission buffer.
Figure 4:
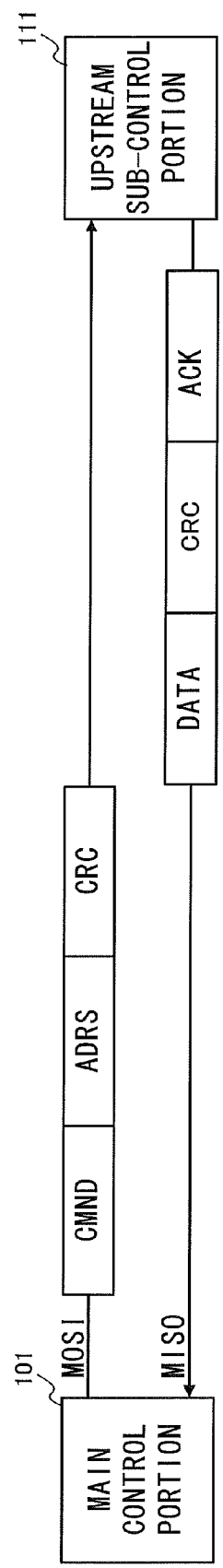
FIG. 4 is a diagram illustrating a configuration example of communication packets that are exchanged to read data out of a reception buffer.

A data format example in serial communication is described with reference to FIGS. 3 and 4. FIG. 3 is a configuration example of communication packets that are exchanged to write data in the transmission buffer. FIG. 4 is a configuration example of communication packets that are exchanged to read data out of the reception buffer.

In FIGS. 3 and 4, Master Out Slave In (MOSI) means that a communication packet from the main control portion 101 which is a master station is received by the upstream sub-control portion 111 which is a slave station. Master In Slave Out (MISO) means that a communication packet from the upstream sub-control portion 111 which is a slave station is received by the main control portion 101 which is a master station.

Referring to FIG. 3, the main control portion 101 transmits a communication packet in which CMND (a command), ADRS (an address), DATA (data), and a cyclic redundancy check (CRC) code are arranged in the order stated.

The upstream sub-control portion 111 (the CPU 112) compares the CRC code contained in the received communication packet against a CRC code that is created in the upstream sub-control portion 111 from CMND, ADRS, and DATA. In the case where the two match, ACK (a command) is transmitted to the main control portion 101. In the case where the received CRC code and the CRC code created in the upstream sub-control portion 111 do not match, NACK (a command) is transmitted to the main control portion 101, though not shown. CMND and others may also be referred to as frame data.

CMND contained in the communication packet from the main control portion 101 includes a write command for writing data in an area that is specified by ADRS, a read command for reading data out of the specified area, or the like. CMND may also include an instruction to transfer read data to a downstream control portion.

The frame data of FIG. 3 is described briefly. In asynchronous serial communication, a start bit which indicates the start of communication, a plurality of bits of data, a parity bit for detecting a data error, and a stop bit which indicates the end of communication constitute one piece of frame data. For example, the frame data can be used alone as is the case for ACK described above. A plurality of pieces of frame data such as CMND, ADRS, DATA, and a CRC code may be combined to constitute one communication packet to render a meaning in communication such as communication for executing the write command or read command described above.

CRC is as described in the Description of the Related Art but is described in detail once more. A CRC code is a type of function that outputs a value of a fixed size in response to an input of data having an arbitrary length, and is also a type of error detection code for detecting successive errors. For example, target communication data is divided by a given constant number and the remainder is used as a numerical value for the check. CRC is higher in error detection accuracy and in calculation speed than the parity checksum method, and has an advantage in that the calculation can be made by scanning bit by bit. In addition, this can be implemented by a simple hardware circuit. Because of this and other features, CRC is used widely for data transfer in networks to hardware circuits. In this embodiment, a CRC code is created as described later when a communication packet is received, and the created CRC is compared against the received CRC code.

Returning to FIG. 3, the main control portion 101 determines that communication has succeeded by receiving ACK from the upstream sub-control portion 111, and prepares for the next communication. In the case where NACK is received, on the other hand, the main control portion 101 determines that communication has failed and retransmits the data that has been transmitted. The retransmission is repeated until the upstream sub-control portion 111 returns ACK.

In the case where ACK or NACK from the upstream sub-control portion 111 is not received, the main control portion 101 waits for a given period of time before retransmitting the communication packet that has been transmitted. If the communication packet is retransmitted a plurality of times and NACK is returned, or no response is received, for every retransmission, the main control portion 101 determines that communication has not been established, displays a communication error message, and ceases communication.

FIG. 4 differs from FIG. 3 in the arrangement of frame data in a communication packet. In the example of FIG. 4, the main control portion 101 transmits a communication packet in which CMND, ADRS, and a CRC code are arranged in the order stated. CMND includes a command for reading data (DATA) at a specified address (ADRS).

The upstream sub-control portion 111 creates a CRC code for CMND and ADRS contained in the received communication packet. The CRC code created by the upstream sub-control portion is compared against the CRC code contained in the received communication packet. In the case where the two match, the upstream sub-control portion 111 transmits ACK, DATA read at the specified address, and a CRC code to the main control portion 101. The CRC code transmitted from the upstream sub-control portion 111 is calculated from DATA to be transmitted to the main control portion 101.

In the case where the received CRC code and the CRC code created by the upstream sub-control portion 111 do not match, on the other hand, NACK is transmitted to the main control portion 101 as in FIG. 3. The upstream sub-control portion 111 does not transmit DATA and a CRC code in this case.

The main control portion 101 confirms that communication has succeeded by receiving ACK from the upstream sub-control portion 111, and then receives DATA and a CRC code that follow.

The main control portion 101 determines whether or not the communication packet from the upstream sub-control portion 111 contains an error by a check that uses a CRC code. Specifically, the main control portion 101 creates a CRC code for CMND and other pieces of received frame data, and compares the received CRC code against the CRC code created by the main control portion 101. In the case where the two match, the received communication packet is treated as a reliable packet. In the case where the main control portion 101 receives NACK, or the received CRC code does not match the created CRC code, processing of FIG. 3 is executed. Specifically, the read execution operation that has been conducted is conducted again.

Even when communication succeeds without the intrusion of noise or the like in a communication packet from the main control portion 101 to the upstream sub-control portion 111, there may be noise in ACK from the upstream sub-control portion 111. The main control portion 101 in this case cannot recognize what is received as ACK, and needs to retransmit the communication packet that has been transmitted.

CMND contained in a communication packet is described next in detail.

Figure 5:
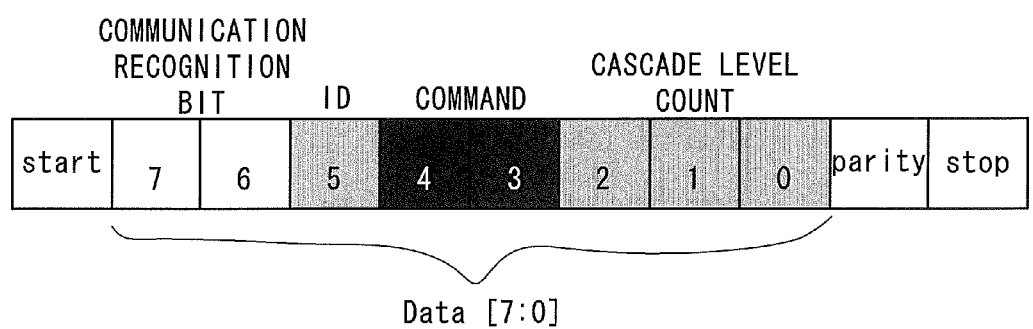
FIG. 5 is a diagram illustrating a data structure example of a command (CMND) in a communication packet.

A data structure example of CMND is illustrated in FIG. 5. In the example of FIG. 5, CMND is constituted of eleven bits. Specifically, CMND includes a start bit (start) indicating the start of a frame in a communication packet, subsequent eight bits of data (Data), a parity bit (parity) for detecting a data error, and a stop bit (stop) indicating the end of the frame which are arranged in the order stated.

The eight bits of data (Data) are broken into two significant bits (7 and 6) which are communication recognition bits, the third bit (5) from the most significant bit which is identification information (ID) for identifying whether the packet is for communication to its own control portion or to another cascade connection destination, the fourth and fifth bits (4 and 5) from the most significant bit which are an instruction command indicating write (data write) execution or read (data read) execution, and less significant bits (2, 1, and 0) which indicate the count of remaining cascade levels till the transmission destination of the information is reached.

A communication recognition bit plays the role of preventing malfunction due to an anomaly in received data. For instance, consider a case where a received communication packet contains "L (Low)" in succession over a given interval due to the intrusion of noise in a communication line. If the logic of a communication line is "H (High)" when communication is not held, the logic of the start bit (start) is "L". The main control portion 101 and the upstream sub-control portion 111 detect "L" of the communication line due to noise and determine that communication has started. Then, the control portions 101 and 111 erroneously determine that subsequent inputs of "L" as data (Data) and a parity bit (parity) which follow the start bit. Ultimately, "L" may continue to the stop bit (stop) whose supposed logic is "H". In this case, an error is recognized as a frame length anomaly. However, if noise turns the logic to "H" at the location of the stop bit (stop), the main control portion 101 and the upstream sub-control portion 111 do not recognize an error. In order to prevent this inconvenience, the two significant bits of data (Data) following the start bit (start) act as communication recognition bits and are set to one of combinations "HL", "LH", and "HH". Malfunction due to noise is thus prevented.

The subsequent one bit (5) which indicates an ID indicates that the transmission destination of the information is a control portion on the next cascade level. For example, when a communication packet transmitted from the main control portion 101 has "L" as the ID, the upstream sub-control portion 111 determines that the transmission destination of the information is the upstream sub-control portion 111. When the ID is "H", on the other hand, the upstream sub-control portion 111 determines that the transmission destination of the information is the downstream sub-control portion 121.

The two bits (2 and 4) indicating an instruction command are assigned, for example, "HL" when write execution is instructed and "LH" when read execution is instructed.

The three less significant bits indicating the remaining cascade level count indicate how many cascade levels remain till the communication destination device (control portion) is reached. For example, when the remaining cascade level count is "000", the packet is for communication to its own control portion. The packet is for communication to a cascade connection destination on the next cascade level when the remaining cascade level count is "001", and the remaining cascade level count "010" indicates that the packet is for communication to a cascade connection destination on two cascade levels down from its own control portion. The bits indicating the remaining cascade level count are decremented when the packet is transferred to a downstream cascade connection destination.

In this embodiment, the main control portion 101 and the sub-control portions 111 and 121 have the same configuration, and recognition using a specific port is not conducted in order to allocate relative addresses. This means that how far downstream along cascade connection from the main control portion 101 the upstream sub-control portion 111 and the downstream sub-control portion 121 are located cannot be recognized from information of a specific port or the like. Accordingly, each control portion determines whether a communication packet is destined to itself by referring to the ID and the remaining cascade level count. In the case where the communication packet is destined to itself, the control portion executes reception processing, and otherwise operates as a relay. When operating as a relay, the control portion rewrites the ID and/or the remaining cascade level count, and then transfers the communication packet to a cascade connection destination on the next cascade level. For example, when a communication packet has "H" as the ID and "001" as the remaining cascade level count, this communication packet is destined to a cascade connection destination on the next cascade level. Therefore, the ID in CMND is rewritten with "L" and the remaining cascade level count in CMND is rewritten with "000" before the communication packet is transmitted to a cascade connection destination on the next cascade level.

Thus, a control portion that has received a communication packet only needs to determine whether the communication packet is for communication to itself or for communication to a downstream cascade connection destination. As a result, a function equivalent to that of a configuration in which relative addresses are allocated is implemented with a simple circuit structure without such a configuration.

This embodiment uses two types of information as information that indicates a packet destination, the ID and three less significant bits indicating the remaining cascade level count. This is for enhancing the reliability of information that indicates a packet destination. The three less significant bits indicating the remaining cascade level count may be used alone as information that indicates a packet destination. How many bits are used as information indicating the remaining cascade level count can be set to suit the count of cascade levels available for cascade connection, and more or less than three bits can be used.

(Communication Mode)

A more concrete description is given next on steps of communication in the communication system configured as described above from the main control portion 101 to the downstream sub-control portion 121 via the upstream sub-control portion 111.

Figure 6:
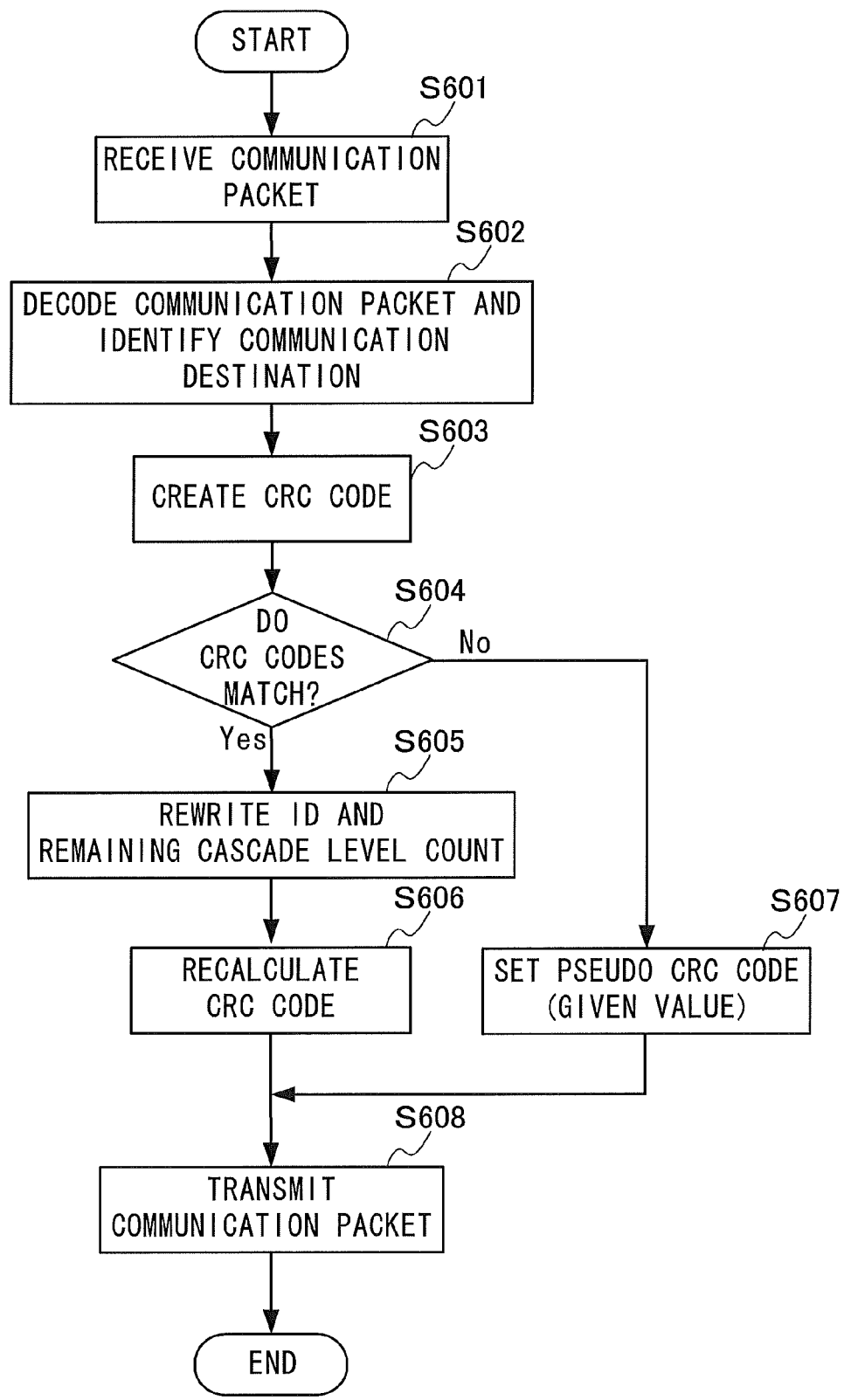
FIG. 6 is an explanatory diagram of operation steps of an upstream sub-control portion 111.

FIG. 6 is an explanatory diagram of operation steps of the upstream sub-control portion 111 in this case.

The main control portion 101 sets the ID and the cascade level count that are included in CMND to "H" and "001", respectively, because the downstream sub-control portion 121 is two cascade levels down from the main control portion 101. The main control portion 101 also creates a CRC code for CMND. The main control portion 101 generates a communication packet that contains these and transmits the communication packet to the upstream sub-control portion 111.

The upstream sub-control portion 111 receives the communication packet from the main control portion 101 (S601), and buffers the communication packet. The upstream sub-control portion 111 decodes the contents of the communication packet and identifies the communication destination of the communication packet from bit information that is included in CMND and indicates the ID and the cascade level count (S602). The communication packet in this example is destined to the downstream sub-control portion 121, and the upstream sub-control portion 111 therefore creates a CRC code for the received CMND (S603). The upstream sub-control portion 111 compares the created CRC code against the received CRC code to determine whether or not the two match (S604). In the case where the CRC codes match (S604: Yes), the upstream sub-control portion 111 rewrites bit information that is included in the received CMND and indicates the ID and the cascade level count (S605). Specifically, the ID included in CMND which is "H" is rewritten with "L" and the remaining cascade level count included in CMND which is "001" is rewritten with "000".

Thereafter, the CRC code is recalculated to suit the rewritten ID and remaining cascade level count (S606). The CRC code needs to be changed to reflect the change to bit information in CMND within the communication packet because otherwise the downstream sub-control portion 121 cannot execute normal error determination.

In the case where the CRC codes do not match in S604 (S604: No), on the other hand, a given value is set to the CRC code (S607). Specifically, the CRC code is set differently from one that is obtained by a normal algorithm to create a pseudo CRC code. The pseudo CRC code is created from the following reason.

If the CRC code is recalculated by a normal algorithm, the recalculation is executed with adverse effects of noise included, in other words, with an error contained in the bit information of CMND. The fact that an error has occurred in the data cannot be detected in a downstream cascade connection destination because the downstream sub-control portion 121 internally generates a CRC code for the received data based on the recalculated CRC code and matches the generated CRC code against the received CRC code. If this situation is left unattended, the adverse effects of noise can be propagated downstream. A pseudo CRC code is created in this embodiment in order to avoid this situation.

The communication system is thus purposely designed so that error processing is executed in the downstream sub-control portion 121. The transmission of a write command or a read command to the downstream sub-control portion 121 is therefore prevented and retransmission from the main control portion 101 can be prompted.

After finishing the recalculation of the CRC code or the creation of a pseudo CRC code, the upstream sub-control portion 111 transmits a communication packet that contains the recalculated CRC code or the pseudo CRC code and the changed CMND to the downstream sub-control portion 121 (S608).

Relaying a communication packet by the upstream sub-control portion 111 always causes a certain amount of delay. Communication lines are not in use when communication is not held. This point is described below with reference to FIG. 7.

Figure 7:
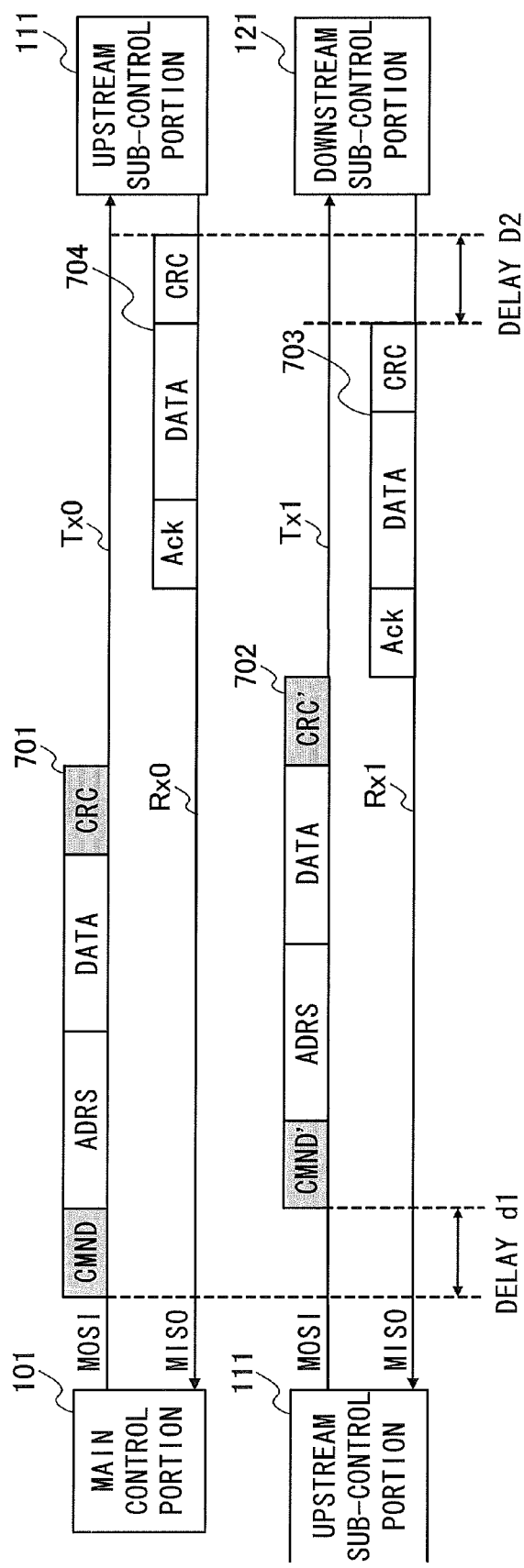
FIG. 7 is an explanatory diagram of transmission/reception timing of communication packets.

FIG. 7 is an explanatory diagram of timing of communication between a control portion and a cascade connection destination. The upper part of FIG. 7 illustrates timing of communication between the main control portion 101 and the upstream sub-control portion 111, and the lower part of FIG. 7 illustrates timing of communication between the upstream sub-control portion 111 and the downstream sub-control portion 121. MOSI indicates transmission to a slave station, and MISO indicates reception from a slave station.

The upstream sub-control portion 111 receives a communication packet 701 from the main control portion 101 and buffers the communication packet 701 in the reception buffer of the buffer portion 204. The upstream sub-control portion 111 determines whether the communication packet 701 is destined to the upstream sub-control portion 111 or is to be transferred to the downstream sub-control portion 121. When the communication packet 701 is not destined to the upstream sub-control portion 111, the upstream sub-control portion 111 performs processing of rewriting the contents of CMND contained in the communication packet. Consequently, a communication packet 702 transmitted (relayed) to the downstream sub-control portion 121 is delayed by d1 with respect to the communication packet 701.

In the case where a response communication packet 703 is received after the communication packet 702 is transmitted to the downstream sub-control portion 121, the received communication packet 703 is, in principle, transferred as it is without recalculating the CRC code or performing other types of processing. However, the received communication packet 703 is buffered in the reception buffer of the buffer portion 204. A communication packet 704 which is a response to the main control portion 101 is delayed by d2 in order to determine what the first frame data in the communication packet 703 is. The communication lines are not in use during this period.

The communication lines are not in use also before the transmission of the communication packet 701 from the main control portion 101 to the upstream sub-control portion 111, before the transmission of the communication packet 703 from the downstream sub-control portion 121 to the upstream sub-control portion 111, and during a period after the transmission of the communication packet 704 in which no communication is held.

Focusing on one of the two communication lines that connect the main control portion 101 and the upstream sub-control portion 111, a communication line Rx0 is used for MOSI (from the master station to the slave station) during the transmission of the communication packet 701 from the main control portion 101 to the upstream sub-control portion 111. A communication line Tx0, on the other hand, is not used for MISO during the transmission of the communication packet 701. Conversely, during the transmission of the communication packet 704 from the upstream sub-control portion 111 to the main control portion 101, the communication line Rx0 is not used for MOSI and the communication line Tx0 is used for MISO.

In this embodiment, communication packets are transmitted automatically to the main control portion 101 from the sub-control portions 111 and 112 at these times when the communication lines are free. This function is called "sub-control portion automatic transmission function" in this embodiment. Communication packets automatically transmitted from the sub-control portions 111 and 121 are particularly referred to as "automatic transmission packets". The sub-control portion automatic transmission function is described below with reference to FIG. 8.

Figure 8:
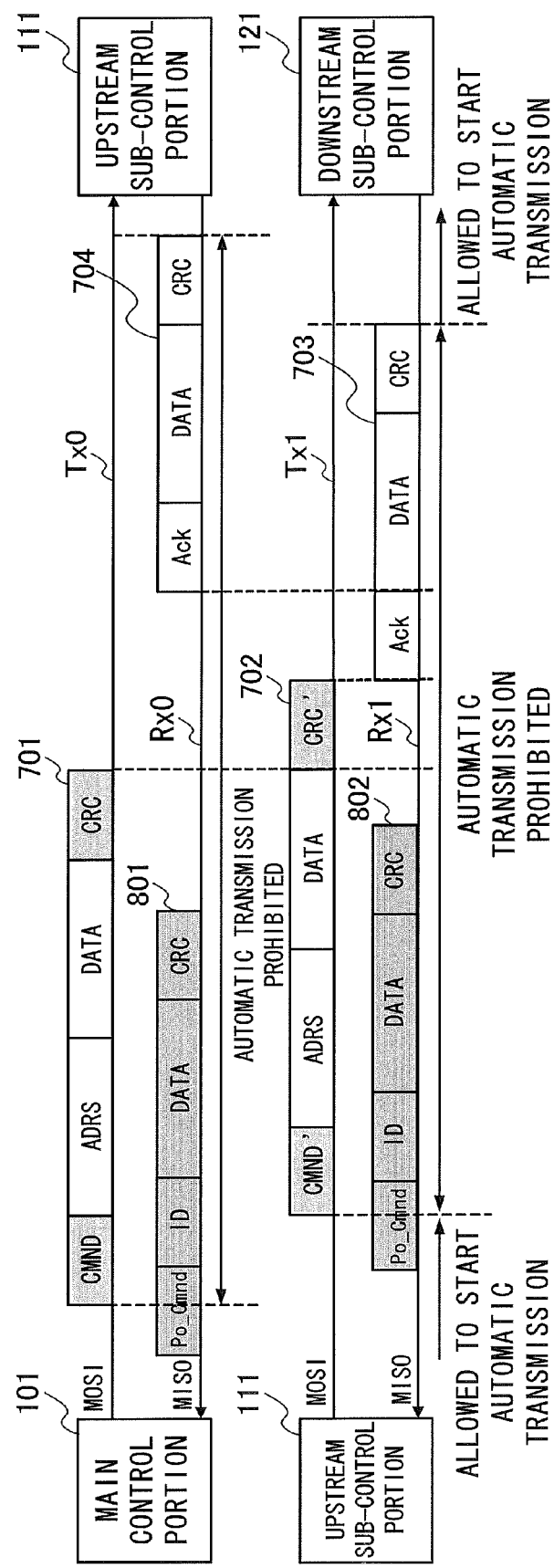
FIG. 8 is an explanatory diagram of transmission/reception timing of automatic transmission packets.

Automatic transmission between the main control portion 101 and the upstream sub-control portion 111 is allowed before a communication packet is transmitted from the main control portion 101 to the upstream sub-control portion 111, and after the transmission of a communication packet from the upstream sub-control portion 111 to the main control portion 101 is finished. A similar relation is established in automatic transmission between the upstream sub-control portion 111 and the downstream sub-control portion 121. In the example of FIG. 8, an automatic transmission packet 801 is inserted at the time when the reception line Rx0 from the upstream sub-control portion 111 to the main control portion 101 is free. An automatic transmission packet 802 is inserted at the time when a reception line Rx1 from the downstream sub-control portion 121 to the upstream sub-control portion 111 is free.

In the automatic transmission packets 801 and 802, the first frame is assigned a different discrimination command from ACK and NACK, "Po_Cmnd" in the example of FIG. 8. This discrimination command is a start command indicating the start of an automatic transmission packet. Discriminating an automatic transmission packet from a communication packet that is a response to a request of the main control portion 101 (such as ACK and DATA) is thus made easy.

Frames that follow the discrimination command are assigned ID, DATA (data to be transmitted to the main control portion 101), and a CRC code in the order stated. The ID indicates what number the currently transmitted automatic transmission packet is, counted from the automatic transmission packet that has been transmitted first. The ID is a number that is set by the main control portion 101 and that indicates an (ascending/descending) order in which automatic transmission packets are to be transmitted. Discriminating what number the automatic transmission packet in question is among a plurality of automatic transmission packets is thus made easy.

The automatic transmission packets 801 and 802 are transmitted as many times as a transmission request count specified in CMND that is issued to the downstream sub-control portion 121, in an order specified in this CMND. The main control portion 101 records the transmission request count and the order in a memory or the like, and decreases the recorded transmission request count each time the automatic transmission packets 801 and 802 are received.

The contents of the automatic transmission packets 801 and 802 are information that changes minute by minute such as information of ports monitored by the downstream sub-control portion 121, data that has undergone analog/digital (A/D) conversion of an analog signal, or the status of a timer module.

The automatic transmission packet 802 is received by a recipient (the upstream sub-control portion 111 in the example of FIG. 8) despite the fact that the recipient has not transmitted a communication packet. The upstream sub-control portion 111 therefore needs to determine whether what is received is the adverse effects of noise on the communication line, or the automatic transmission packet 802. The upstream sub-control portion 111 also needs to determine whether the received packet is an automatic transmission packet to be returned by the downstream sub-control portion 121 to the main control portion 101, or a communication packet (such as ACK or DATA) that is a response to a request of the main control portion 101.

For that purpose, the upstream sub-control portion 111 refers to the first frame of a received communication packet when sending the received communication packet to the reception buffer of the buffer portion 204. As described above, the upstream sub-control portion 111 determines that the received packet is a response to a request of the main control portion 101 when the first frame is ACK or DATA, and determines that the received packet is an automatic transmission packet when "Po_Cmnd" is assigned to the first frame.

As illustrated in FIG. 8, the upstream sub-control portion 111 prohibits automatic transmission after the reception of a communication packet from the downstream sub-control portion 121 is completed till the communication packet is transferred to the main control portion 101. This is to adjust the traffic flow of packets so that a collision is avoided between a communication packet that is transmitted to the main control portion 101 by the upstream sub-control portion 111 and a communication packet that is received from the downstream sub-control portion 121 and transferred to the main control portion 101. A sequence of this adjustment is illustrated in FIG. 9.

Figure 9:
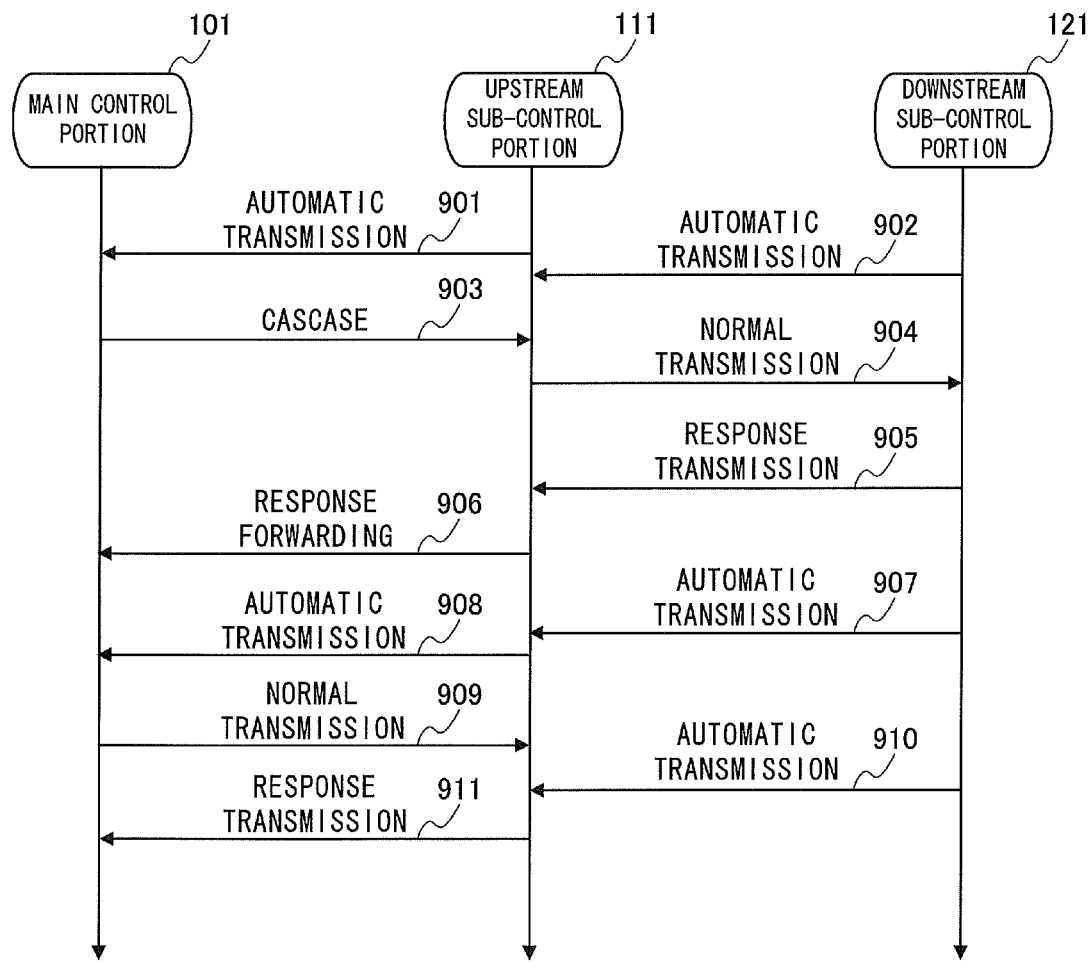
FIG. 9 is an explanatory diagram of an adjustment sequence of automatic transmission packets.

In FIG. 9, "automatic transmission" means the transmission of an automatic transmission packet. "Cascade" represents communication for requesting transmission to a cascade connection destination. "Normal transmission" means the transmission of a normal communication packet from the upstream to the downstream along cascade connection. "Response transmission" means the transmission of a response to a command issued from the main control portion 101. "Response forwarding transmission" is transmission in which the upstream sub-control portion 111 forwards a response received from the downstream sub-control portion 121 to the main control portion 101 as it is.

Automatic transmission 901 from the upstream sub-control portion 111 to the main control portion 101 is executed while the upstream sub-control portion 111 is not receiving communication packets from the main control portion 101. Automatic transmission 902 from the downstream sub-control portion 121 to the upstream sub-control portion 111 is executed while the downstream sub-control portion 121 is not receiving communication packets from the upstream sub-control portion 111.

In cascade 903, a connection destination is specified and an ID and a CRC code that are different from those in normal transmission are therefore used. The upstream sub-control portion 111 stops automatic transmission once the cascade 903 is detected.

In normal transmission 904, a communication packet is transmitted in the form of normal transmission after the ID is changed and the CRC code is recalculated in the manner described above in order to make it look as though the downstream sub-control portion 121 directly receives the communication packet transmitted from the main control portion 101. In this embodiment, where the cascade level count is one (only the upstream sub-control portion 111 and the downstream sub-control portion 121), normal transmission is accomplished at this stage. In the case where the cascade level count is 2 or higher, on the other hand, the normal transmission in the upstream sub-control portion 111 is cascade transmission (using an ID and a CRC code that differ from those in cascade transmission of the main control portion 101).

In response transmission 905, only ACK (or NACK) is returned when a command from the main control portion 101 is a write command. In the case of a read command, on the other hand, ACK and subsequent DATA at a specified address and a CRC code are returned as one communication packet in the response transmission 905.

In response forwarding transmission 906, CRC code recalculation is not executed. This means that, when viewed from the main control portion 101, it looks as though a response is received directly from the downstream sub-control portion 121.

Automatic transmission 907 from the downstream sub-control portion 121 to the upstream sub-control portion 111 is executed in a time slot where the communication line Rx1 is free. When the response forwarding transmission 906 is being performed, however, automatic transmission from the downstream sub-control portion 121 can be executed even in the middle of the response forwarding transmission 906. Unless there is communication from the upstream sub-control portion 111 to the downstream sub-control portion 121, automatic transmission from the downstream sub-control portion 121 can be executed as soon as the transmission of communication packets to be transmitted from the downstream sub-control portion 121 is completed.

The relation established in the automatic transmission 907 applies to automatic transmission 908 as well. Specifically, when there is no communication from the main control portion 101 to the upstream sub-control portion 111 and there is no communication, excluding automatic transmission, from the downstream sub-control portion 121 to the upstream sub-control portion 111, automatic transmission from the upstream sub-control portion 111 can be executed as soon as the transmission of communication packets to be transmitted from the upstream sub-control portion 111 is completed.

Normal transmission 909 is transmission from the main control portion 101 to the upstream sub-control portion 111. The upstream sub-control portion 111 recognizes the normal transmission 909 as communication to the upstream sub-control portion 111, and therefore executes response transmission 911 instead of transferring a communication packet to the downstream sub-control portion 121, which is the cascade connection destination of the upstream sub-control portion 111. The downstream sub-control portion 121 can continue automatic transmission 910 to the upstream sub-control portion 111 irrespective of whether the response transmission 911 is executed or not.

The upstream sub-control portion 111 and the downstream sub-control portion 121 stop automatic transmission when response transmission or response forwarding transmission is executed.

The output data flow adjustment between the upstream sub-control portion 111 and the main control portion 101 which is described above applies to adjustment between the downstream sub-control portion 121 and the upstream sub-control portion 111. Designing a communication system configuration is made simpler because the traffic flow of data can be adjusted irrespective of whether the cascade connection destination is the downstream sub-control portion 121 or the upstream sub-control portion 111.

How polling data is identified and transferred is described next. If the upstream sub-control portion 111 transfers a communication packet received from the downstream sub-control portion 121 as it is, the main control portion 101 cannot identify from where the received communication packet has been transmitted. In the case of automatic transmission packets, in particular, the main control portion 101 cannot determine whether the received packet is an automatic transmission packet from the upstream sub-control portion 111 or an automatic transmission packet from the downstream sub-control portion 121. Moreover, if automatic transmission packets are simply transferred, there is a chance of collision between the transmission of an automatic transmission packet by the upstream sub-control portion 111 and the transfer of an automatic transmission packet from a cascade connection destination.

An adjustment to avoid this collision is therefore made in this embodiment. Specifically, the upstream sub-control portion 111 is controlled so that a given count of communication packets can be buffered in the buffer portion 204 when communication packets (or automatic transmission packets) are received from the downstream sub-control portion 121. This control is exerted by the buffer controller 209 over the buffer portion 204 of the serial communication I/F 113. Steps of this adjustment operation are described with reference to FIG. 10.

Figure 10:
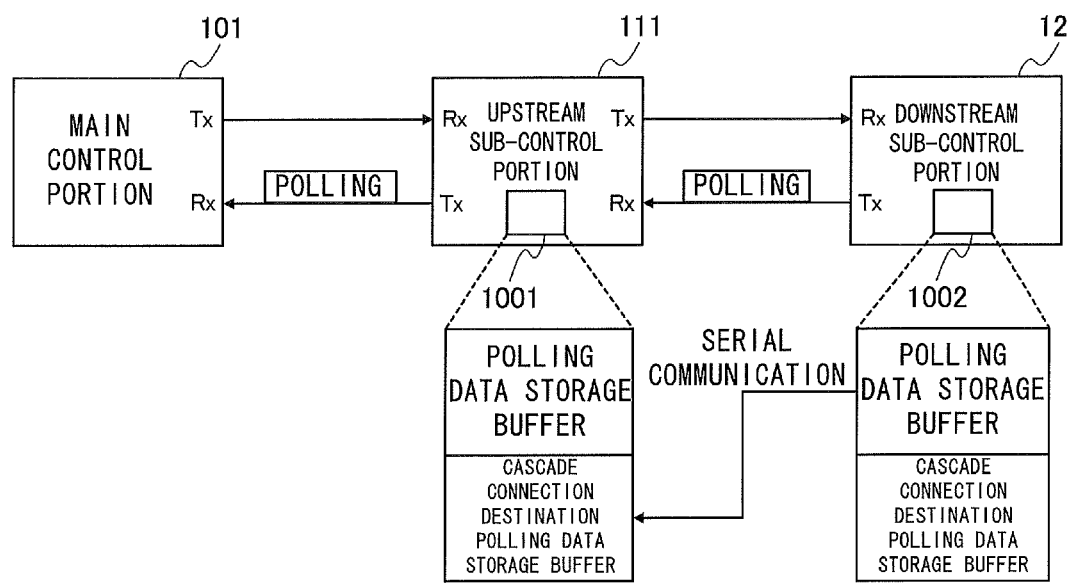
FIG. 10 is an explanatory diagram of a buffer that keeps automatic transmission packets.

Referring to FIG. 10, a buffer area 1001 and a buffer area 1002 are formed in the buffer portion 204 of the upstream sub-control portion 111 and the buffer portion 204 of the downstream sub-control portion 121, respectively. Formed in the buffer area 1001 and the buffer area 1002 each are a polling data storage buffer and a cascade connection destination polling data storage buffer. The polling data storage buffer stores automatic transmission packets. The cascade connection destination polling data storage buffer stores automatic transmission packets from a cascade connection destination.

The buffer controller 209 stores an automatic transmission packet that has been stored in the polling data storage buffer of the buffer area 1002 in the cascade connection destination polling data storage buffer of the buffer area 1001 once. Thereafter, the upstream sub-control portion 111 determines a priority order between the automatic transmission packet from the downstream sub-control portion 121 which is stored in the cascade connection destination polling data storage buffer and an automatic transmission packet that is to be transmitted automatically by the upstream sub-control portion 111. The priority order is determined by, for example, the state of the communication line Rx1 or the load of the upstream sub-control portion 111. The automatic transmission packets are then transmitted in the determined order. The collision is thus prevented.

Figure 11:
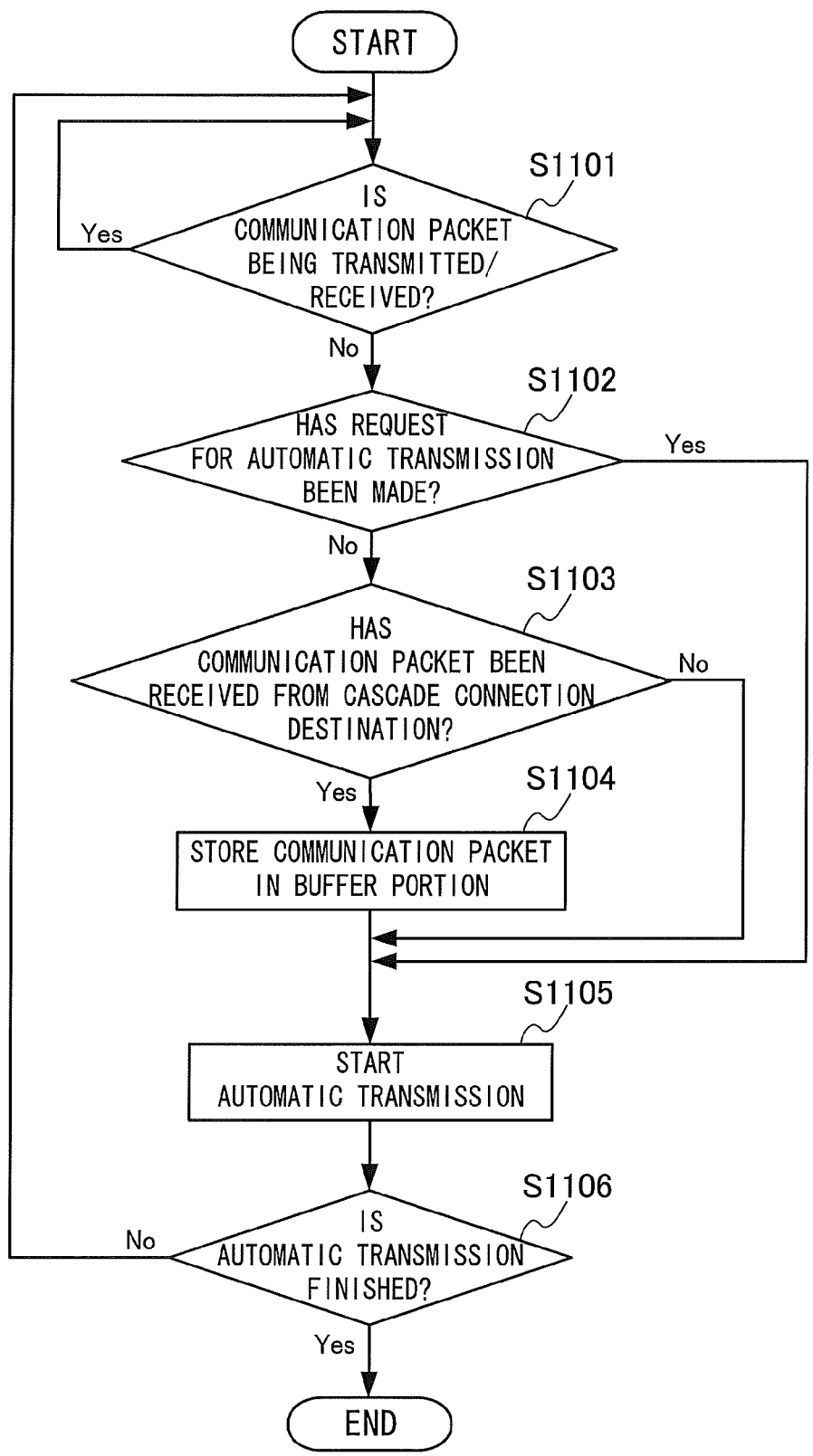
FIG. 11 is an explanatory diagram of steps of an automatic transmission packet adjustment operation in a downstream sub-control portion.

An example of control steps for this case is illustrated in FIG. 11. In FIG. 11, the buffer controller 209 of the upstream sub-control portion 111 determines whether or not there is a communication packet that is being received or being transmitted. In other words, the buffer controller 209 executes polling (S1101). In the case where a packet is being received, the buffer controller 209 waits for the completion of the reception for a given period of time, and then checks again. In the case where a packet is being transmitted, the buffer controller 209 waits for a given period of time and then checks again (S1101: Yes).

In the case where a packet is not being received/transmitted (S1101: No), the buffer controller 209 checks whether or not the main control portion 101 or the downstream sub-control portion 121 has made a request for automatic transmission (S1102). In the case where a request for automatic transmission has been made (S1102: Yes), the buffer controller 209 executes automatic transmission irrespective of whether a communication packet from a cascade connection destination has been received or not (S1105).

In the case where a request for automatic transmission has not been made (S1102: N), on the other hand, the buffer controller 209 checks whether or not a communication packet from a cascade connection destination has been received (S1103). In the case where a packet has been received from a cascade connection destination and the received packet is determined as an automatic transmission packet (S1103: Yes), the automatic transmission packet from a cascade connection destination is stored in the buffer portion 204 (S1105). In the case where a packet has not been received from a cascade connection destination (S1103: No), storing a communication packet in the buffer portion 204 is not executed.

When buffering the automatic transmission packet from a cascade connection destination in S1104, the buffer controller 209 increments the ID indicating the place in transfer order of the automatic transmission packet, and recalculates the CRC code in the last frame of the automatic transmission packet. The buffered automatic transmission packet is discarded in S1105 if the received CRC code and a generated CRC code do not match.

Automatic transmission is then started (S1105). When every packet has been transferred and automatic transmission is finished (S1106: Yes), the buffer controller 209 ends the processing for the adjustment. In the case where a buffered automatic transmission packet that has not been transferred is found (S1106: N), the buffer controller 209 returns to S1101.

Automatic transfer may also be ended by setting the communication system accordingly.

As has been described, this embodiment only requires the upstream sub-control portion 111 to determine whether a received communication packet is destined to the upstream sub-control portion 111 or a downstream control portion by referring to CMND contained in the received packet, in particular, the ID and the remaining cascade level count. The drop in communication baud rate is therefore minimized.

In addition, effective error detection is accomplished because the CRC code is recalculated based on the decremented value of a component of CMND, or is set to a given value, during communication depending on whether or not there is the intrusion of noise. The communication baud rate can also be improved by making full use of connection lines via the sub-control portion automatic transmission function.

An example of using a CRC code as an error detection code has been discussed in this embodiment. However, other error detection codes such as a checksum may be used instead.

Although an example of packeting communication data into a communication packet has been discussed in this embodiment, communication data does not always be need to be packeted. Frame data can be used as communication data.

In the description of this embodiment, the main control portion 101 is mounted in a main control unit of an image forming apparatus, and the sub-control portions 111 and 112 are mounted in image forming units of the image forming apparatus or sub-control units which are mounted in a conveyor mechanism or the like of the image forming apparatus. However, the present invention is not limited to this example, and is applicable to other uses where distributed control is performed by a plurality of devices having a communication function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-143966, filed Jun. 27, 2012, which is hereby incorporated by reference herein in its entirety.

What is claimed is:

1. A communication system, comprising:
a plurality of communication devices including a first communication device and a second communication device, which are connected by cascade connection, the first communication device including:
first transmitting unit configured to transmit first information to the second communication device which is on a cascade level next to the first communication device, wherein the first information comprising:
communication data destined to another communication device, which is one of the plurality of communication devices, that is n-th cascade level down from the first communication device,
a count of remaining cascade level till the n-th cascade level, and
a first error detection code;
first creating unit configured to create the first error detection code for the communication data and the count;
the second communication device including:
second creating unit configured to create second error detection code for the communication data and the count in the received first information;
a determining unit configured to determine, in the case where the second error detection code matches with the first error detection code in the received first information, whether or not the communication data is destined to the second communication device based on the count in the first information;
second creating unit configured to, in the case where the communication data is not destined to the second communication device, correct the count, and create a second error detection code for the communication data and the corrected count; and
second transmitting unit configured to, in the case where the communication data is not destined to the second communication device, transmit second information comprising the communication data, the corrected count and the second error detection code to a third communication device, which is on a cascade level next to the second communication device.

2. The communication system according to claim 1, wherein the second creating unit reduces the count in the first information by 1.

3. The communication system according to claim 1, wherein the first information comprising
the communication data, the count, the first error detection code and
a data for indicating whether the another communication device is the destined communication device or not.

4. A communication system according to claim 1, wherein, in the case where the second error detection code does not match with the first error detection code, the second creating unit set a predetermined data, which makes sure that the third communication device determines that there is an error, as the second error detection code.

5. A communication system according to claim 1,
wherein the first communication device is configured to generate the communication data that comprises a command for requesting the another communication device to transmit an automatic transmission packet, which is discriminated from one of a response and a non-response to the communication data, and
wherein the another communication device is configured to send an automatic transmission packet to the first communication device in response to the command at a time when a communication path is free.

6. A communication system according to claim 5,
wherein the command comprises a transmission request count about requests for transmission of the automatic transmission packet, and
wherein the first communication device is configured to record the transmission request count and decrease the recorded transmission request count each time the automatic transmission packet is received.

7. A communication system according to claim 1,
wherein the second communication device is configured to buffer the received communication data, and
wherein, when it is determined that the another communication device is not the second communication device and communication target information is kept in the second communication device in addition to the communication data, the second communication device determines a priority order between transmission of the communication data to the third communication device and transmission of the communication data to a transmission destination device of the communication target information based on a state of a communication path.

8. A communication device on a first cascade level of a cascade connection that connects a plurality of communication devices, comprising:
a communication control portion which holds serial communication with one of the plurality of communication devices that is on a cascade level next to the communication device;
a buffer portion which comprises a transmission buffer and a reception buffer;
a processing portion; and
a data conversion portion,
wherein the processing portion is configured to:
create information destined to one of the plurality of communication devices that is n cascade levels down from the processing portion, a count of remaining cascade levels till the n-th cascade level, and an error detection code for communication data, which comprises the information destined to the communication device n cascade levels down from the processing portion and the remaining cascade level count;
keep the communication data and the created error detection code in the transmission buffer; and
execute given processing for information from the communication device n cascade levels down which is kept in the reception buffer, and
wherein the data conversion portion is configured to:
convert the communication data and the error detection code that are kept in the transmission buffer into serial data;
transmit the serial data obtained by the conversion to the communication device on the next cascade level via the communication control portion;
convert serial data that is received from the communication device on the next cascade level via the communication control portion into parallel data; and
keep the parallel data obtained by the conversion in the reception buffer.

9. A communication device according to claim 8, further comprising a frequency divider counter for determining a count that is required to transmit 1 bit width of data in serial communication,
wherein the communication control portion is configured to receive a count of pieces of communication data kept in the transmission buffer, and cut, when the received communication data count is high, short time required for transmission of one bit by reducing a value of the frequency divider counter.

10. A communication device according to claim 8, wherein the communication data comprises a communication recognition bit, which is at least one of a few significant bits following a start bit and which has a logic level different from a logic level of the start bit.

11. A communication device on a cascade level that is other than a first cascade level of a cascade connection that connects a plurality of communication devices, comprising:
a communication control portion which holds serial communication between one of the plurality of communication devices that is on a preceding cascade level and one of the plurality of communication devices that is on a next cascade level;
a buffer portion which comprises a transmission buffer and a reception buffer;
a processing portion;
a first data conversion portion; and
a second data conversion portion,
wherein the processing portion is configured to:
create an error detection code for communication data that is received from the communication device on the preceding cascade level along with another error detection code;
compare the created error detection code against the received error detection code;
determine, when the error detection codes match, whether or not the processing portion is a transmission destination of information destined to one of the plurality of communication devices that is m cascade levels down from the communication device on the preceding cascade level, based on a remaining cascade level count which is included in the communication data along with the information and which indicates a count of remaining cascade levels till the m-th cascade level;
create, when the information is not destined to the processing portion, new communication data in which the remaining cascade level count is reduced by 1 and newly create an error detection code for the new communication data;
keep the created error detection code along with the new communication data in the transmission buffer; and
keep, when information from the communication device m cascade levels down is received, the received information in the reception buffer,
wherein the first data conversion portion is configured to:
convert the communication data and the error detection code that are kept in the transmission buffer into serial data;
transmit the serial data obtained by the conversion to the communication device on the next cascade level via the communication control portion;
convert serial data that is received from the communication device on the next cascade level via the communication control portion into parallel data; and
keep the parallel data obtained by the conversion in the reception buffer, and
wherein the second data conversion portion is configured to:
convert parallel data that is received from the communication device on the next cascade level and kept in the reception buffer into serial data; and transmit the serial data obtained by the conversion to the communication device on the preceding cascade level via the communication control portion.

12. A communication device according to claim 11, further comprising a frequency divider counter for determining a count that is required to transmit 1 bit width of data in serial communication, wherein the communication control portion is configured to receive a count of pieces of communication data kept in the transmission buffer, and cut, when the received communication data count is high, short time required for transmission of one bit by reducing a value of the frequency divider counter.

13. A communication device according to claim 11, wherein the communication data comprises a communication recognition bit, which is at least one of a few significant bits following a start bit and which has a logic level different from a logic level of the start bit.

* * * * *